United States Patent [19]

Ohnishi

[11] 3,969,949

[45] July 20, 1976

[54] FILLERLESS WELDED CHAIN

[75] Inventor: Tatsuo Ohnishi, Kishiwada, Japan

[73] Assignee: Tsubakimoto Chain Co., Osaka, Japan

[22] Filed: Apr. 18, 1975

[21] Appl. No.: 569,454

Related U.S. Application Data

[63] Continuation-in-part of Ser. No. 353,794, April 23, 1973, abandoned.

[30] Foreign Application Priority Data

May 1, 1972 Japan................................ 47-42580

[52] U.S. Cl.................................. 74/255 R; 59/8; 59/35 R; 59/31
[51] Int. Cl.².................... B21L 9/08; F16G 13/02; B21L 9/00
[58] Field of Search............. 74/245 R, 246, 253 R, 74/254, 251 R, 255 R; 59/8, 35, 35 CP, 31, 84; 29/DIG. 38, DIG. 48; 219/121 EBM, 121 L

[56] References Cited
UNITED STATES PATENTS

| | | | |
|---|---|---|---|
| 2,155,584 | 4/1939 | Bryant et al. | 74/251 R |
| 2,512,429 | 6/1950 | Jones | 74/251 R |
| 2,844,042 | 7/1958 | Mercier | 74/245 R |
| 2,983,158 | 5/1961 | Hodlewsky | 59/8 |
| 3,518,400 | 6/1970 | Gallivan | 219/121 EB |
| 3,562,888 | 2/1971 | Settle | 219/121 EB |
| 3,630,097 | 12/1971 | Kuratomi | 74/245 LP |

OTHER PUBLICATIONS

Richard J. Allen, "High Frequency—what it means to welding design," Jan. 4, 1960, pp. 42 and 43, Product Engineering.
R. R. Irving, "Laser Welding Moves up a Notch," May 25, 1967, pp. 83–85, The Iron Age.

Primary Examiner—Benjamin W. Wyche
Assistant Examiner—A. Russell Burke
Attorney, Agent, or Firm—Woodhams, Blanchard and Flynn

[57] ABSTRACT

A roller chain including a series of inner links each formed by a plurality of parallel inner link plates connected by a pair of hollow bushes. The inner links are connected by a series of outer links. Each outer link comprises a pair of parallel outer link plates connected adjacent the opposite ends thereof by a pair of pins. The pins on a given outer link extend through the bushes on the adjacent ends of two inner links to pivotally connect same together. The inner link plates and the associated bushes forming the inner links are fused together by a fillerless weld formed by electron beam or laser welding. The pins and the outer link plates can be similarly welded together. The resulting chain has substantially increased tensile and fatigue strength.

6 Claims, 18 Drawing Figures

| | ASSEMBLING OF PARTS | | COMPARISON OF TENSILE RUPTURE TEST RESULTS | |
|---|---|---|---|---|
| | BUSH LINK SUBASSEMBLY | PIN LINK SUBASSEMBLY | RUPTURE BREAKING STRENGTH | BREAKING POSITION |
| NO. 1 ENGAGED-TYPE CHAIN | BUSH LINKS ARE SIMPLY ENGAGED WITH BUSH LINK PLATES | PINS ARE PRESSED AND FASTENED INTO PIN LINK PLATES. PIN LINK PLATE THICKNESS = BUSH LINK PLATE THICKNESS | 28,700 Kg | PERFORATED PORTION IN THE BUSH LINK PLATE |
| NO. 2 ARC-WELDED CHAIN | BOTH END OF BUSHES ARE PRESSED INTO OPENINGS IN BUSH LINK PLATES, AFTER PREPARING THEIR EDGES, AND ARC-WELDED | PINS ARE PRESSED AND FASTENED INTO PIN LINK PLATES. PIN LINK PLATE THICKNESS = BUSH LINK PLATE THICKNESS | 35,800 Kg | WELDED PORTION IN THE BUSH LINK SUBASSEMBLY IN THE PERFORATED PORTION OF THE BUSH LINK PLATE |
| NO. 3 ELECTRON-BEAM-WELDED CHAIN A-TYPE | AFTER PRESSING BUSHES INTO BUSH LINK PLATES, THE ENTIRE ENGAGED PORTIONS ARE ELECTRON-BEAM-WELDED. WELDING DEPTH = BUSH LINK PLATE THICKNESS | PIN IS PRESSED AND FASTENED INTO ONE OF THE OPENINGS IN A PIN LINK PLATE AND THEIR ENTIRE ENGAGED PORTIONS ARE ELECTRON-BEAM-WELDED. PIN LINK PLATE THICKNESS = BUSH LINK PLATE THICKNESS | 43,100 Kg | PERFORATED PORTION IN THE PIN LINK PLATE |
| NO. 4 ELECTRON-BEAM-WELDED CHAIN B-TYPE | AFTER PRESSING BUSHES INTO LINK PLATES THE ENTIRE ENGAGED PORTIONS ARE ELECTRON-BEAM-WELDED. WELDED DEPTH ≥ BUSH LINK PLATE THICKNESS | PINS ARE PRESSED AND FASTENED INTO PIN LINK PLATES. PIN LINK PLATE THICKNESS > BUSH LINK PLATE THICKNESS | 46,800 Kg | PIN |

FIG.18 ized for experimental test purposes.
FILLERLESS WELDED CHAIN

FIELD OF THE INVENTION

This invention relates to a roller chain and in particular to an improved roller chain having substantially increased tensile and fatigue strength created by connecting the individual link plates to the respective bushes by means of a fillerless fusion weld created by electron beam or laser welding.

BACKGROUND OF THE INVENTION

Conventional steel roller and conveyor-chains are made by alternately joining together an inner link subassembly comprising an inner link plate and a bush pressed therein and an outer link subassembly comprising an outer link plate and a pin pressed therein. When these chains are subjected to tensile load, bending and shearing stresses are exerted on the pin and bush, while tensile stress is applied on the link plates. Particularly, the perforated portion of the link plates where the pin or bush is inserted yields under such tensile stress, thereby giving rise to plastic deformation. Because of this, the engaging force between the outer link plate and the pin and the inner link plate and the bush is reduced, and engagement therebetween is liable to be loosened. Such reduction in engaging force and loose engagement lower the durability of the chain and cause such damages as fatigue and wear rupture of the link plates, pin and bush. To improve the fatigue strength (dynamic strength) of a chain, the following mechanical measures are generally taken:

1. Improvement of paralleledness and machining accuracy of the perforated portion of the link plate.
2. Chamfering of the hole in the link plate.
3. Increase of engaging force between the link plate and the pin or bush through the increase of interference therebetween.
4. Pre-exertion of residual compressive stress on the perforated portion of the link plate.

Despite the adoption of these methods, the dynamic performance of the chain is reduced in actual use by the loosening of engagement occurring under the actual operating thermal stress, atmosphere in use, suitability of machine work, and other factors. Therefore, these are not the perfect measures to improve fatigue strength.

In an effort to improve the dynamic strength of conventional steel roller chains, the link plates have often been welded to the respective pins and bushes by welding techniques utilizing a filler material, such as the well-known arc-welding technique. However, the resulting chains produced using filler-type welds between the link plates and the respective pins or bushes have not provided any significant increase in the strength and durability of the chain, particularly as regards the dynamic or fatigue strength characteristics.

Accordingly, the object of the present invention is to provide a substantially improved roller chain which utilizes a fillerless fusion weld between the link plate and the respective pins or bushes, which fillerless weld results in the chain having substantially increased dynamic strength characteristics.

Specifically, the present invention proposes to render the inner link plates and the bushes, and the outer link plates and the pins, into a complete integral body by welding their total engaged surfaces together by means of a precision welding technique, specifically electron beam welding, or laser welding, thereby providing a fillerless fusion weld along the total engaged surfaces of the respective elements while producing extremely little deformation.

DETAILED DESCRIPTION

Figure 1:
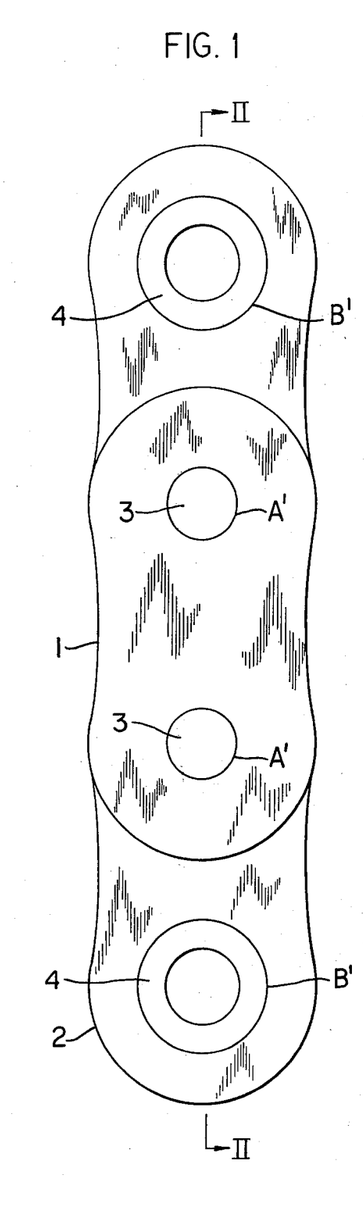
FIG. 1 is a front view illustrating three links of a chain constructed according to the present invention.
Figure 2:
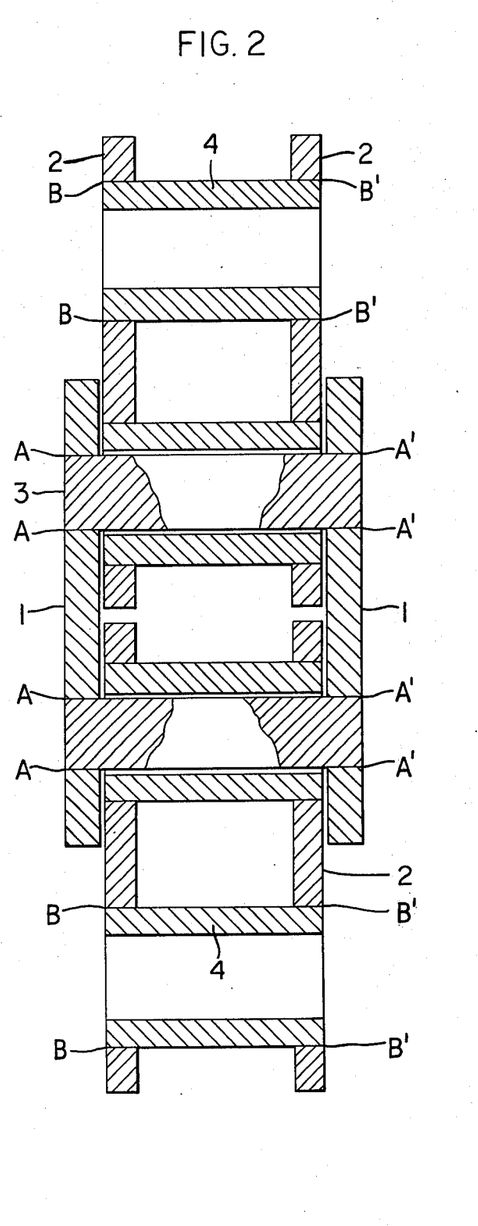
FIG. 2 is a cross-section view taken along the line II—II of FIG. 1.

Referring to FIGS. 1 and 2, reference numerals 1 through 4 designate an outer link plate, an inner link plate, a pin and a bush, respectively. The entire circumference of a portion at which said outer link plate 1 and pin 3 are engaged with each other is precision welded, as shown by A and A', and the same is the case with the engaged portion of said inner link plate 2 and bush 4, as shown by B and B'. However, the pin 3 and the bush 4 are not necessarily welded at both ends. Instead they may be welded at only one end, with the other end being left just engaged so far as suitable arrangements are furnished to keep a balance between the welded and the engaged portions. Otherwise, either of said pins 3 or bushes 4 may be welded, with the remainder being just engaged.

Welding is performed from outside the link plate. The weld must be as thick as or thicker than the full thickness of the link plate, so that the entire engaged surface (both axially and circumferentially) of the engaged portions are perfectly joined by a fillerless fusion weld. With respect to such welding of the engaged portions of the inner and outer links, the problem of welding depth at the engaged portions and the heat treatment specifications for the part thus welded requires particular attention from a performance viewpoint. As machined parts (that is pins, bushes and link plates) are assembled into inner and outer link subassemblies. Then said link subassemblies are combined into one piece by welding the entire circumference of the engaged portions by a precision welding method. After this, heat treatment (such as hardening, tempering or isothermal transformation heat treatment) is given to improve the welded structure. By this means, the most stabilized quality and other excellent characteristics are obtained.

According to this invention, the outer link plates and the pins, and the inner link plates and the bushes, are perfectly fixed at both ends instead of being simply supported at both ends. The result is that both the inner and outer links are imparted with higher rigidity, provided with greater effective cross-sectional area at their ring-shaped portion, and kept free from loose engagement. By the accumulation of such effects, the static and dynamic strength of the chain is increased remarkably. In the case of bushed chains with the engaged portion of their inner link plates and bushes being electron beam welded, the static tensile rupture strength and fatigue strength are from 1.42 and 1.95 times greater than those of unwelded chains. With electron beam welded bushed chains are made up of link plates, bushes and pins, the inside and outside diameters of a bush and the diameter of a pin can be increased to a suitable extent as compared with ordinary roller chains of the same chain pitch, resulting in greater static tensile rupture strength and fatigue strength (up to about twice as great). This makes it possible to design a compact chain transmission system.

With regard to wear life, the possibility to increase the radius of curvature of the contact surface of the pin and bush results in increasing effective bearing area and decreasing surface pressure. This improves the bearing performance, which in turn improves the wear life of the chain. With the conventional chains comprising the combination of the inner link plate and the bush and the outer link plate and the pin, there is a general tendency to attempt to improve their durability by increasing the engaging force by increasing the interference therebetween. This however deforms the inside of the bush. To be more precise, the inside of the bush becomes barrel-shaped on engagement with the link plate, and this tendency to deformation increases with increasing interference. This reduces its contact with the pin to a linear contact only at both ends, thereby rendering it impossible to make effective use of the bearing area. This results in an increase in the initial wear elongation of the chain.

On the other hand, with the electron beam welded chains of the present invention, the inner link plate and the bush are engaged with each other by light interference fit or some other means like that. As compared with the engaged-type chains having bushes of the same inside diameter and pins of the same outside diameter, the inside of the electron beam welded chain bush is much less liable to become barrel-shaped. Besides, welding strain also is very limited. All this makes the effective bearing area large. Consequently, the electron beam welded chains suffer from little initial wear elongation, and therefore acquire greatly extended service life.

Finally, corrosion, heat (characteristics at high temperature) and atmosphere resistance of the electron beam welded chains of the present invention will be discussed. Corrosion, oxidation and stress corrosion cracking of the engaged portions under various atmospheres, creep rupture of the link plate starting from the engaged portions at high temperatures, reduction in durability of the chain due to relaxation of stress etc., and rupture of the chain, which are commonly the case with the conventional steel-made engaged-type chains, are reduced. In addition, this invention permits integral combination of different materials best suited to the intended application and the condition of use. For these reasons, the above-mentioned resistances are greatly improved. All this makes the electron beam welded chains suitable to such applications where low speed and large load are involved, where heat and corrosion resistance are needed, where water treatment is intended, and where durability and resistance to various atmospheres are required. Furthermore, the chains can be made more compact. They are also applicable as offset and other similar chains.

Referring again to FIGS. 1 and 2, the inner link subassembly which is formed by the two bushes 4 and the two inner side plates 2 are welded into one piece, with the fillerless welds B and B' extending throughout the complete width of the side plates 2 so as to create the desired joining of the bushes and side plates throughout the complete engaging areas thereof. This results in a maximum joining between the individual pieces due to the use of electron beam welding.

In a similar manner, the outer link subassembly is formed into one piece by welding the two pins 3 to the two outer side plates 1 so as to create the fillerless welding regions A and A'. These welding regions extend throughout the complete width of the side plates 1 so as to optimize both the engaging and the welded area between the plates and the pins.

As illustrated in FIG. 2, the use of electron beam welding for joining the bushes and pins to the respective link plates permits the use of link plates which are substantially flat and of substantially uniform thickness. Further, use of electron beam welding permits the ends of the pins and bushes to terminate substantially flush with the outer surfaces of the respective link plates, and the weld areas themselves terminate substantially flush with the outer surfaces of the link plates.

The substantial and unexpected improvement in both the static and dynamic strength, that is tensile and fatigue strength, which results from using electron beam welding for forming a chain according to the present invention, in contrast to the much lower static and dynamic strength which exists in conventional engaged type chains and arc-welded chains, will now be explained in detail with reference to accompanying Tables I and II and in conjunction with FIGS. 3–18. These tables and figures graphically depict and illustrate a lengthy and complex experimental evaluation which was conducted on the present invention.

A number of different chain samples were both statically and dynamically tested to demonstrate the substantial improvement in both the tensile and fatigue strengths which result when a roller chain is electron beam welded according to the present invention. The first chain sample designated No. 1 comprises a conventional engaged-type chain, whereas the second chain sample designated No. 2 involves an arc-welded chain wherein the bushes were connected to the respective side plates by a conventional filler-type weld. The third sample designated No. 3 utilized electron beam welding according to the present invention, which electron beam welding, existed at all of the connections between the bushes and respective side plates, and some of the connections between the pins and respective side plates. Sample No. 4 was also an electron beam welded chain according to the present invention and represents a desirable embodiment, and in the sample the bushes were all electron beam welded to the respective side plates. Samples No. 3 and 4, since they both utilize electron beam welding, but were of slightly different welded structure in terms of the actual welding connections involved, have been referred to as the A-type and B-type chains, respectively.

Referring to Table I, same presents therein a listing of the dimensions and heat treatment specifications of the individual parts for the chain samples No. 1–4. All of the chain samples were of the same size, that is a chain pitch of 50.80 mm (equivalent to A.N.S.I. designation No. 160), and all chain samples were of high strength steel.

Figure 3:
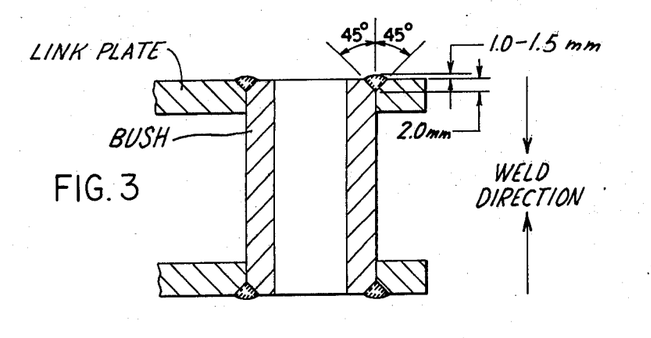
FIG. 3 is a fragmentary cross-sectional view illustrating an arc-welded inner link assembly which was utilized for experimental test purposes.
Figure 4:
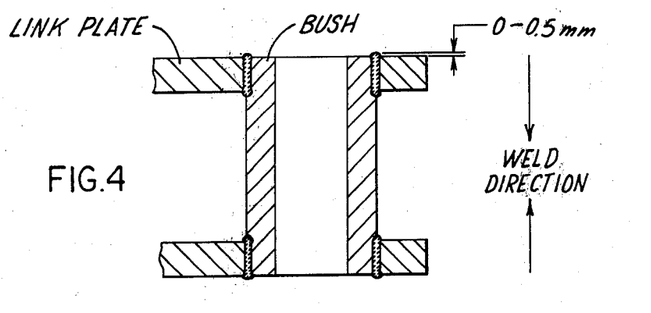
FIG. 4 is a fragmentary cross-sectional view illustrating an electron-beam welded inner link assembly according to the present invention, as used for experimental test purposes.
Figure 5:
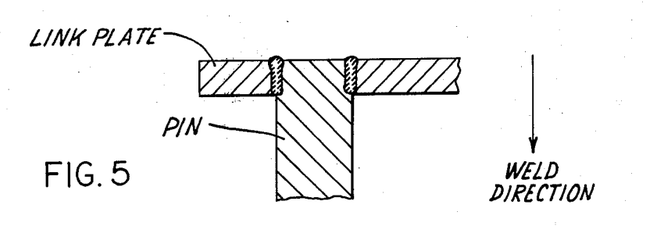
FIG. 5 is a fragmentary cross-sectional view of an electron-beam welded outer link assembly according to the present invention, as utilized for experimental tests.

FIGS. 3–5 illustrate therein the specific configuration used for the samples according to the experimental test program. FIG. 3 specifically illustrates therein the structure of the arc-welded bush link subassembly incorporated into sample No. 2, whereas FIG. 4 illustrates the electron beam welded bush link subassembly as incorporated into samples 3 and 4. FIG. 5 illustrates the electron beam welded pin link subassembly as incorporated into Sample No. 3.

Figure 6:
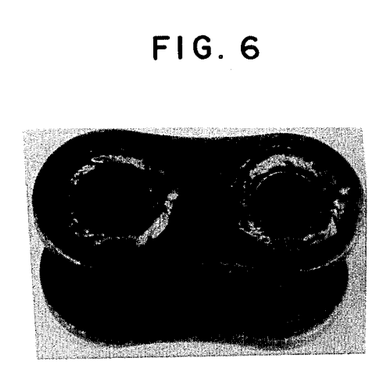
FIG. 6 is a perspective view of an arc-welded inner link assembly prior to experimental testing.
Figure 7:
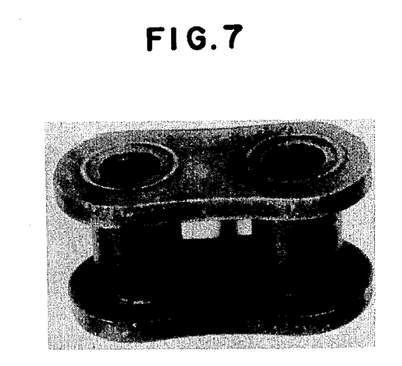
FIG. 7 is a perspective view of an electron beam welded inner link assembly according to the present invention, prior to experimental testing thereof.

FIGS. 6 and 7 are comparative photographic representations of the appearance and shape of the bush link subassembly produced by arc welding and electron beam welding, respectively. As is readily apparent from these illustrations, the electron beam welded bush link subassembly (FIG. 7) of the present invention (which bush link subassembly corresponds to both A-type and B-type chains) has a substantially greater commercial value than the arc-welded bush link subassembly of FIG. 6, since the electron beam welded bush link subassembly has substantially improved accuracy and higher quality workmanship.

Figure 8:
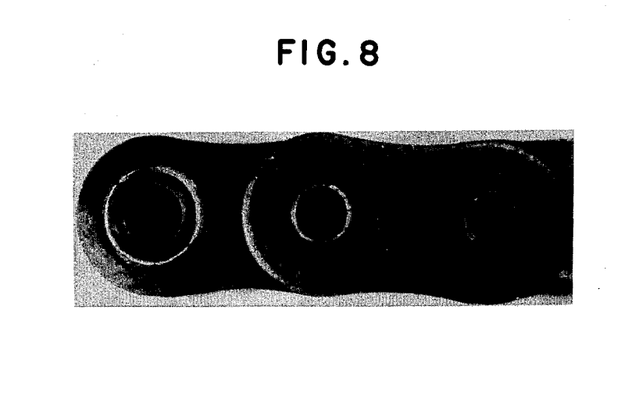
FIG. 8 is a side view illustrating the electron beam weld created between the bush and pin and the respective link plates, in accordance with the present invention.
Figure 9:
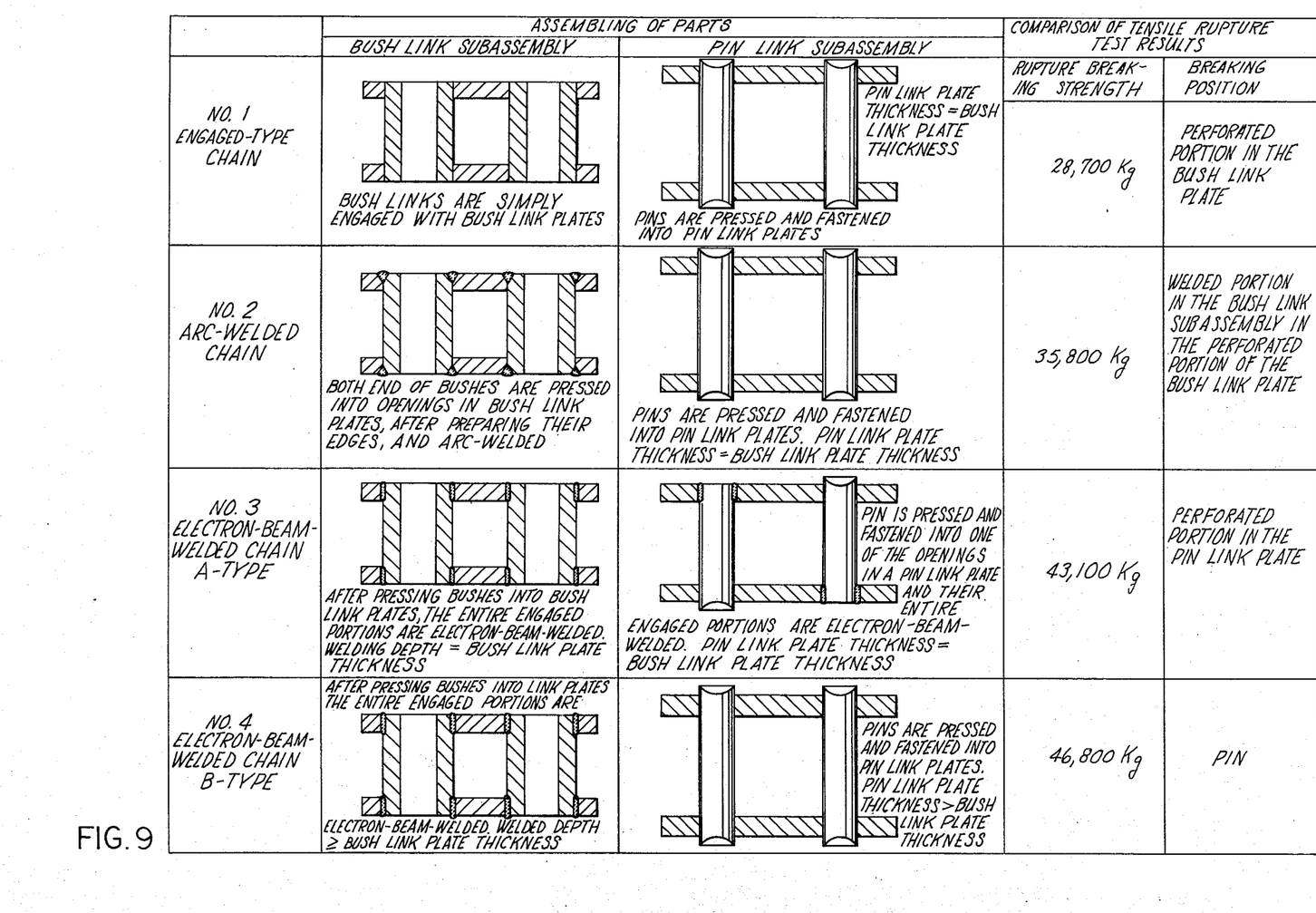
FIG. 9 illustrates four chain samples which were experimentally tested, Chain No. 1 being a conventional engaged-type chain, Chain No. 2 being an arc-welded chain, and Chain No. 3 and 4 being electron beam welded chains according to the present invention.

FIG. 8 is a photographic representation of the appearance and shape of the electron beam welded bush link subassembly and pin link subassembly according to sample No. 3 (A-type), and again illustrates the substantially improved accuracy and workmanship which results from using electron beam welding.

Referring now to Table II, same lists therein the details of the test procedures and also the results of the breaking experiments performed on chain samples No. 1–4 as listed in Table I.

Table II compares the mean value of the tensile rupture strength for the different chain samples. The arc-welded chain (sample No. 2) showed a rupture strength 1.24 times greater than that of the No. 1 chain, with rupture in the arc-welded chain occurring in the welded portion of the bush link subassembly. In contrast, the B-type chain (sample No. 4) according to the present invention had a rupture strength which was 1.63 times greater than the rupture strength of the No. 1 chain. Thus, the B-type chain of the present invention showed a 63 percent increase in tensile strength in comparison to a conventional engaged type chain (sample No. 1), whereas the B-type chains of the present invention also showed a 31 percent increase in tensile rupture strength in contrast to an arc-welded chain (sample No. 2). The electron beam welded chain, and specifically the B-type chain, thus exhibited a rather large increase in strength. Further, in the B-type chain (sample No. 4), the rupture did not occur at the bush link subassembly, such as in the engaged and arc-welded samples, but rather the rupture in the B-type chain occurred due to a failure of one of the pins. This thus indicates that the weakness of the engaged-type and arc-welded chains, which weakness occurs in the bush link assembly, has been totally overcome when utilizing an electron beam welded B-type chain of the present invention since the failure now occurs in a totally different element, namely the pin. Since the pin itself can be provided with greater strength if desired by appropriate material selection and/or heat treatment, it thus becomes apparent that a chain utilizing electron beam welding according to the present invention (such as a B-type chain) can thus be provided with even greater rupture strength if desired. Further, in the B-type chain sample, the thickness of the pin link plate was slightly greater than the thickness of the bush link plates in order to balance the strength of the individual parts.

Figure 10:
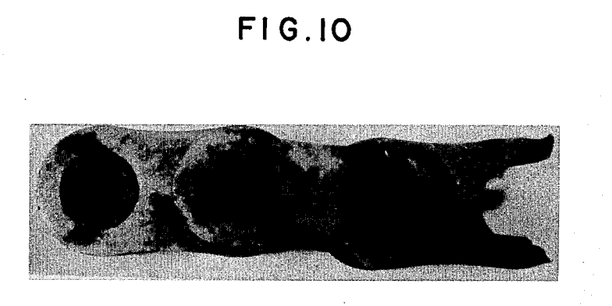
FIG. 10 is a side view of the engaged type chain (Chain No. 1) illustrating the fracture which occurred in the bush link plates when the chain was experimentally subjected to tensile testing.
Figure 11:
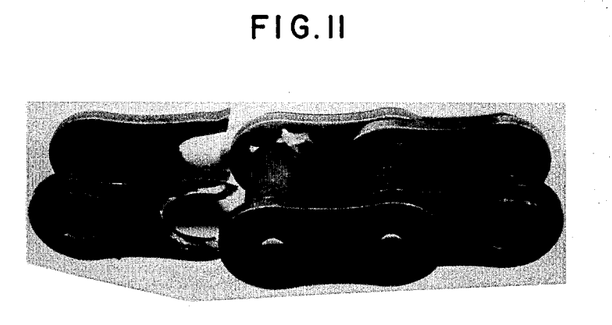
FIG. 11 is a perspective view of the arc-welded chain (Chain No. 2) and illustrating the fracture which occurred in the bush link plates after subjecting the chain to experimental tensile testing.

Referring to FIG. 10, same is a photograph of the No. 1 chain after rupture thereof during experimental tensile testing thereof. This photograph illustrates that the rupture occurs in the link plates associated with the bush link subassembly. In a similar manner, FIG. 11 is a photograph of the arc-welded chain (sample No. 2) after same had been ruptured during tensile rupture testing. FIG. 11 illustrates that the arc-welded chain, like the engaged chain, ruptures due to a failure in the vicinity of the weld between the bush and the respective link plates.

Figure 13:
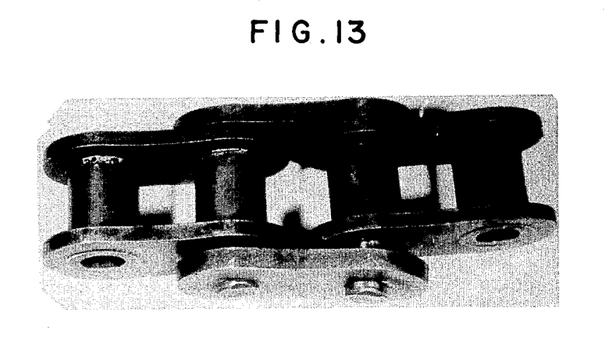
FIG. 13 is a perspective view of an electron beam welded chain (Chain No. 4) and illustrating the fracture which occurred in one of the pins upon subject the chain to experimental tensile testing.
Figure 14:
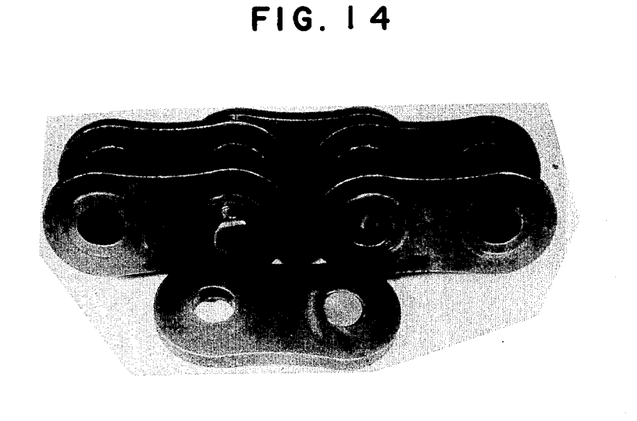
FIG. 14 is a further perspective view of the chain illustrated in FIG. 13 but with one of the pin side plates removed to more clearly illustrate the fracture of the pin.

On the other hand, FIGS. 13 and 14 are photographs of chain sample No. 4 (the B-type chain) which was constructed utilizing electron beam welding according to the present invention. FIGS. 13 and 14 indicate that the rupture in this chain sample occurred due to a shear fracture of one of the pins. No failure or noticeable weakness is exhibited adjacent any of the welded connections in the bush link subassembly.

Figure 12:
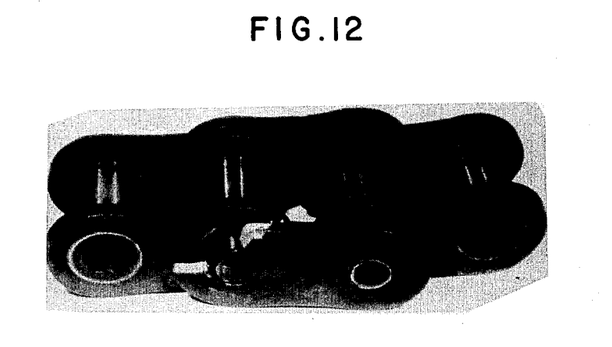
FIG. 12 is a perspective view of an electron beam welded (Chain No. 3) and illustrating the fracture which occurred in the pin link plate upon subjecting the chain to experimental tensile testing.

FIG. 12 is a photograph of sample No. 3 (A-type) and illustrates that the rupture in this case took place in one of the link plates associated with the pin link subassembly, and specifically the rupture occurred in the region between the link plate and pin which were engaged but not welded together.

Thus, as is believed apparent from the above discussion with reference to the accompanying figures, causing each of the bush link and pin link subassemblies to be formed into an integral one-piece body by fusing their total engaged surfaces together by a precision welding method, such as electron beam welding, drastically increases the tensile strength of a chain made up of such parts.

Figure 15:
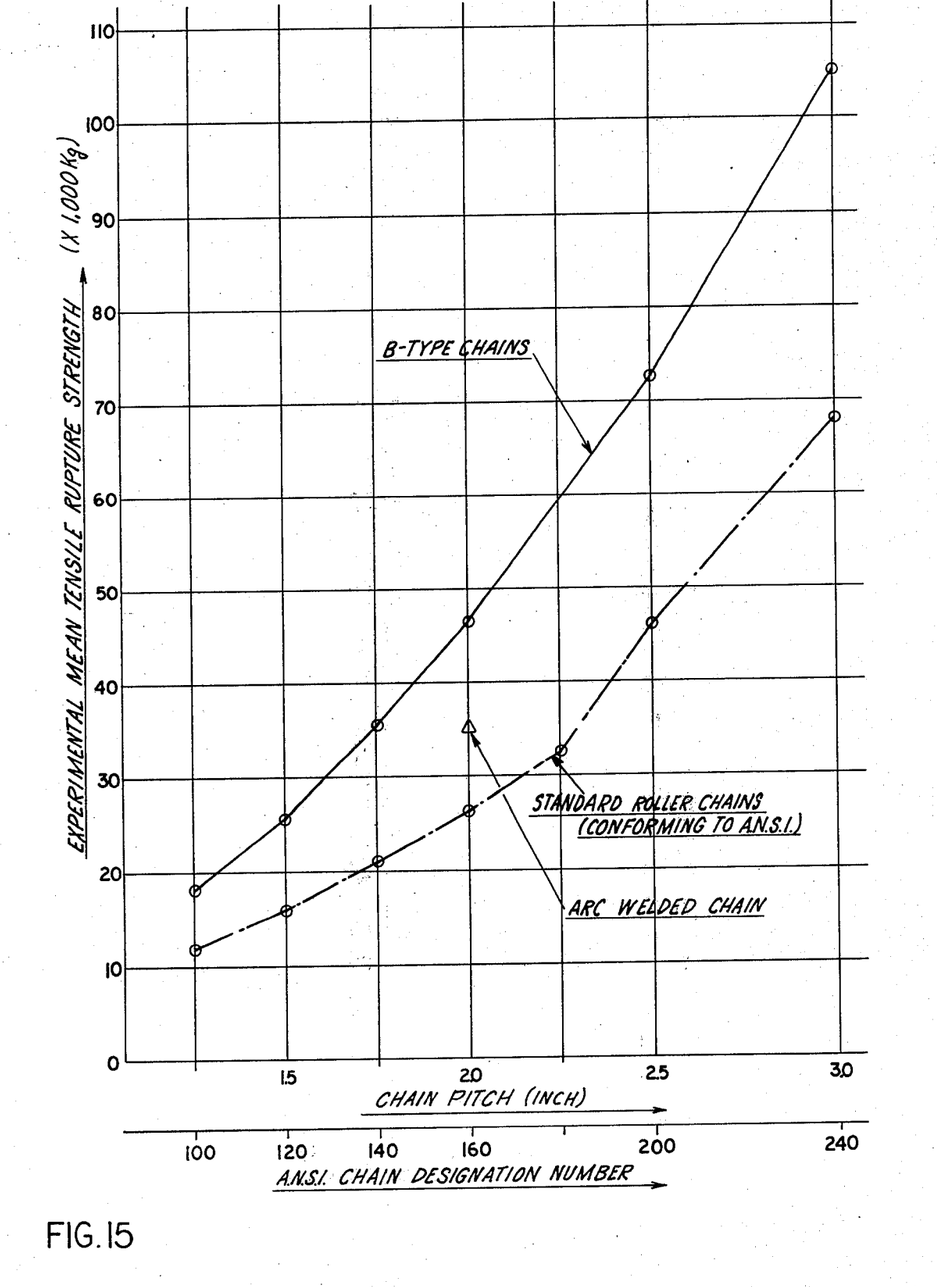
FIG. 15 is a plot illustrating the experimental tensile rupture strength versus the chain pitch.

Referring to FIG. 15, same is a graphical comparison, based on the experimental values, of the relationship between the chain pitch and the mean tensile rupture strengths for a B-type chain according to the present invention and a conventional engaged-type roller chain conforming to the A.N.S.I. standards. As understood from this comparison, the rupture strength of a B-type chain is comparable to that of a roller chain which is two sizes larger.

Figure 16:
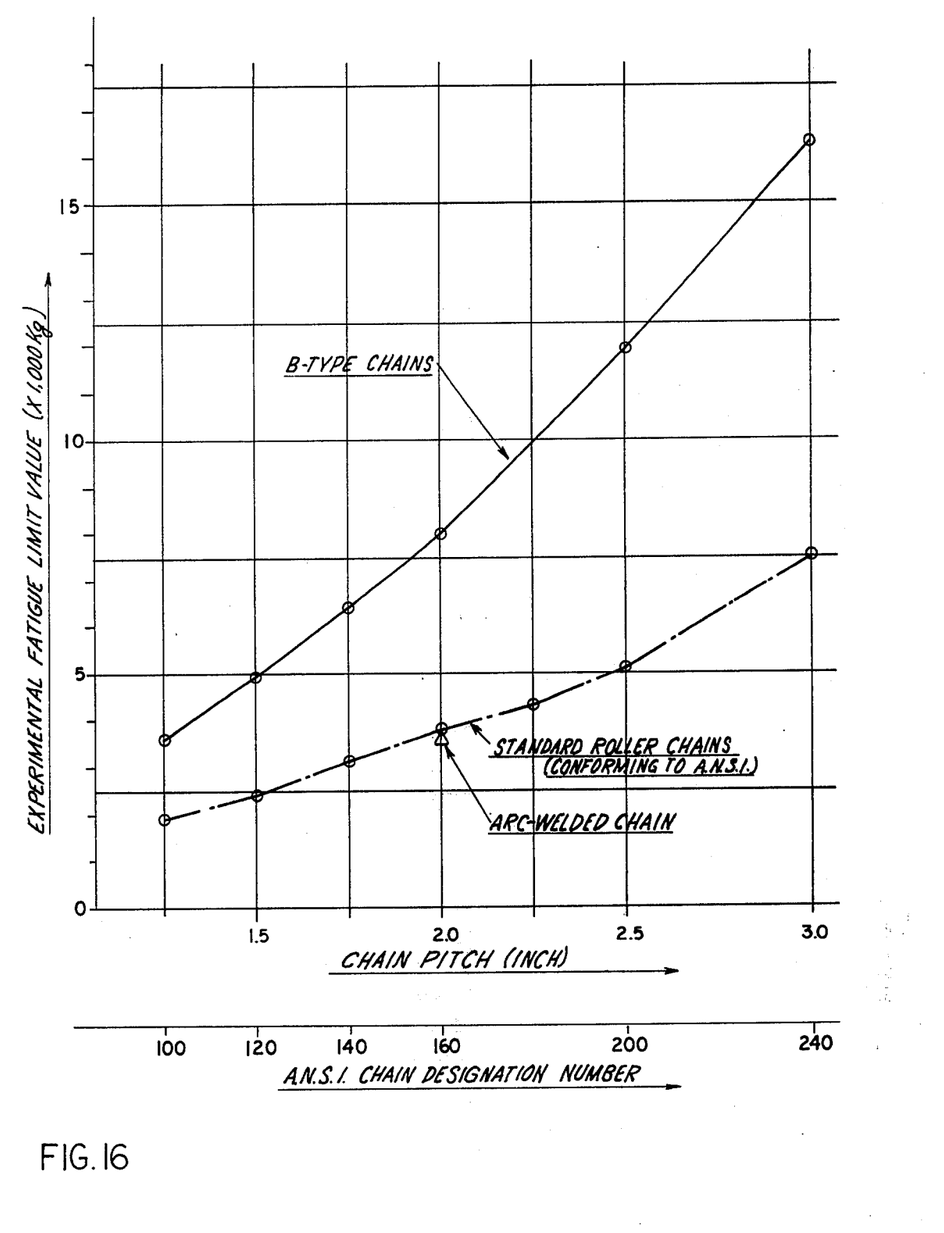
FIG. 16 is a plot illustrating the experimental chain fatigue strength versus chain pitch.

FIG. 16 comprises, based on experimental values, the relationships between the chain pitch and the fatigue limit for a B-type chain according to the present invention and a conventional engaged-type roller chain. As is evidence from this figure, the fatigue limit of the B-type chain is comparable to that of a roller chain which is three or four sizes larger.

Figure 17:
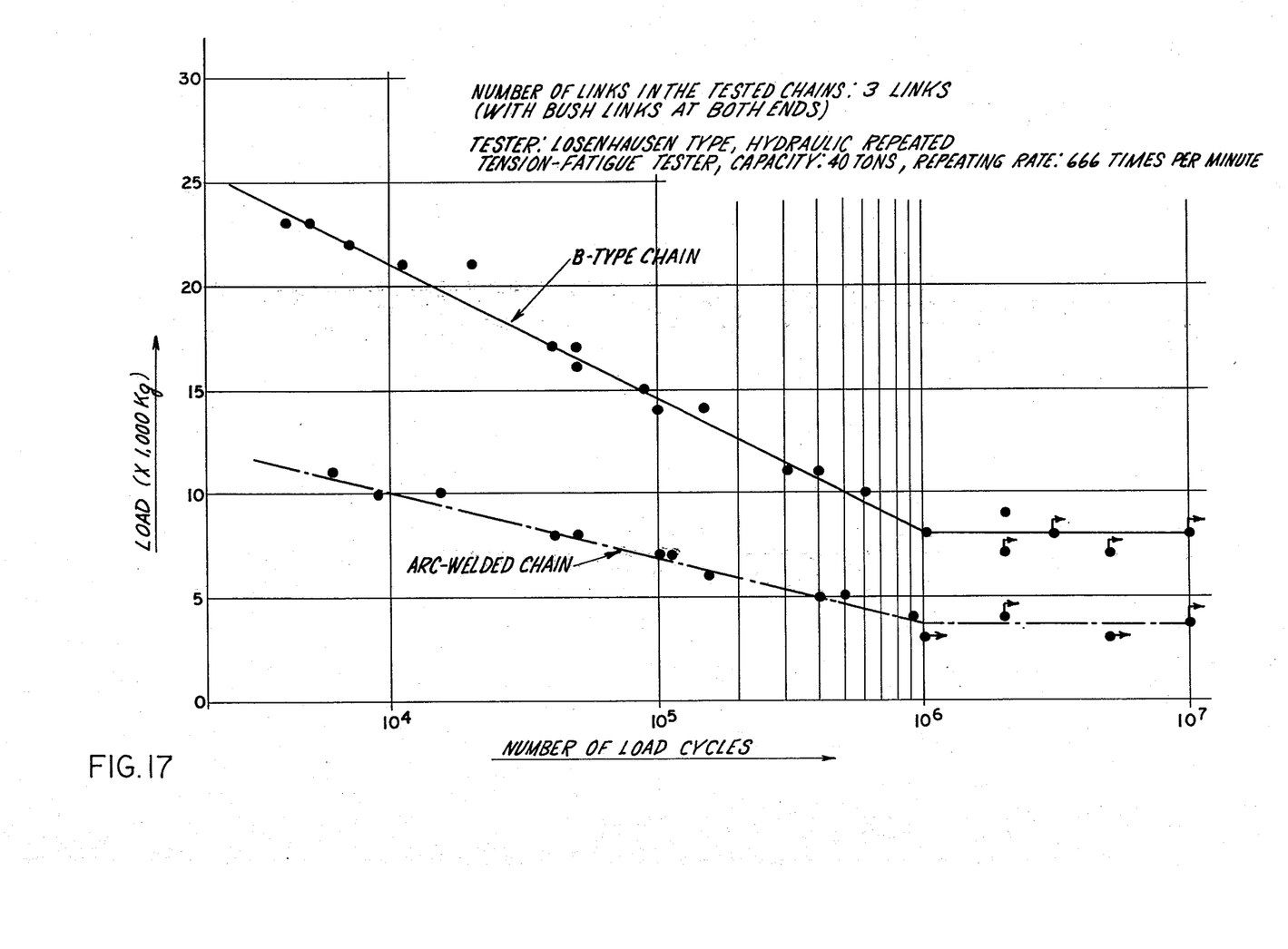
FIG. 17 is a plot illustrating the conventional fatigue characteristic curve of an electron beam welded chain (Chain No. 4) according to the present invention in contrast to an arc-welded chain.

FIG. 17 illustrates the characteristic fatigue curve (normally referred to as an S-N curve) for the B-type chain of the present invention and an arc-welded chain of the same size. The curves in FIG. 17 are plotted based on experimental results. As the curves of FIG. 17 illustrate, the fatigue limit for a B-type chain according to the present invention is more than two times greater than that of an arc-welded chain of the same size.

FIG. 17 also indicates that the B-type chain of the present invention results in a greatly increased life in comparison to an arc-welded chain of the same size when operating within the low-cycle fatigue limit. For example, as noted in FIG. 17, when an arc-welded chain is operated repetitively under a load of 10,000 kilograms, it will have a life of $10^4$ cycles prior to fatigue failure. On the other hand, the same size B-type chain when operating repetitively under a load of 10,000 kilograms will have a life of $5 \times 10^5$ cycles prior to fatigue failure. The fatigue life of the B-type chain of the present invention, in contrast to the same sized arc-welded chain, is thus approximately 50 times of the arc-welded chain when operating within the low-cycle fatigue limit. Needless to say, this represents a very substantial and unexpected improvement when operating under conditions of this type.

Figure 18:
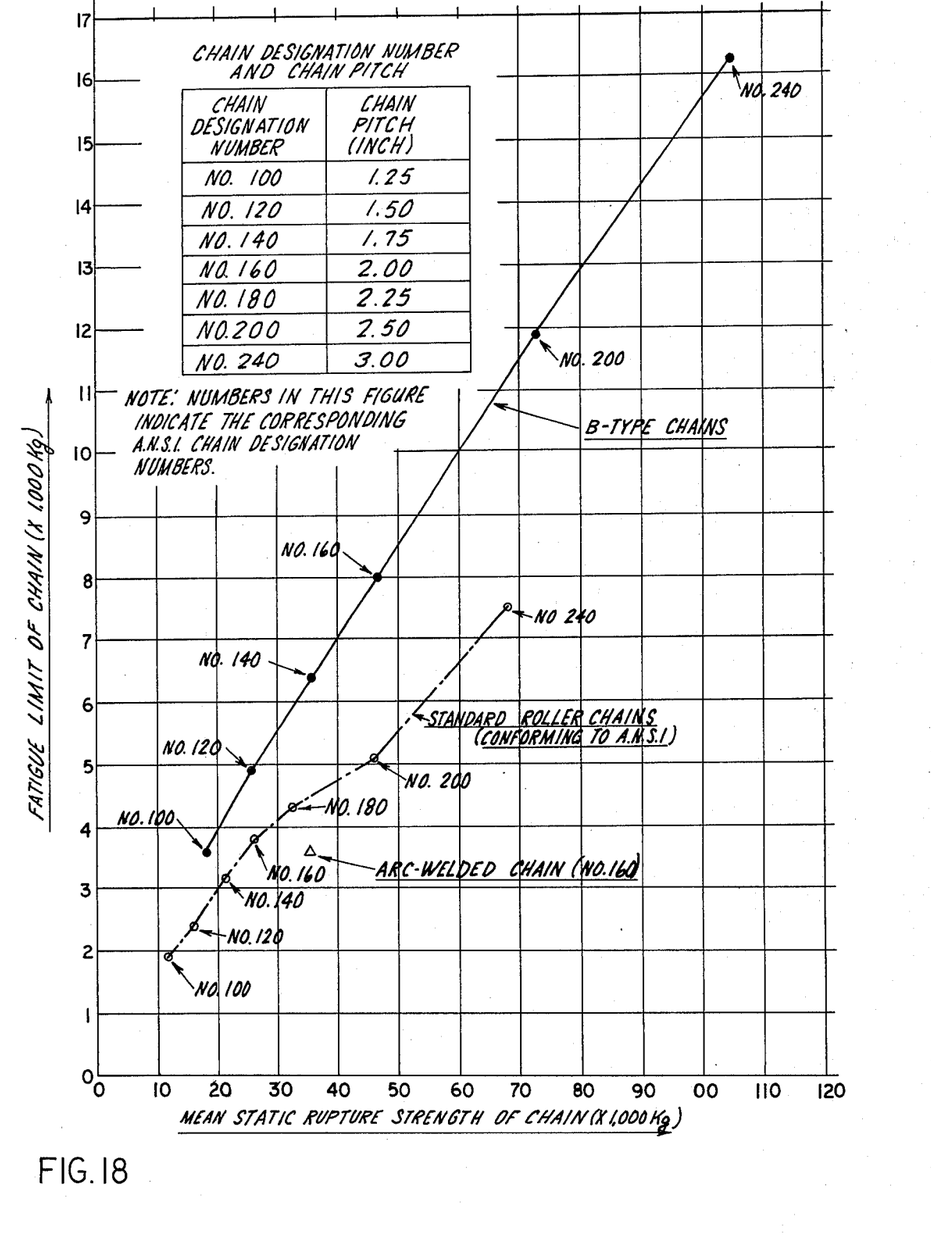
FIG. 18 is a plot illustrating the relationship between the mean static tensile rupture strength versus the fatigue limit for the different types and sizes of chains.

Referring now to FIG. 18, same compares the relationships between the rupture strengths and the fatigue strengths (or the fatigue limit) for the B-type chain of the present invention and a conventional engaged-type roller chain conforming to the A.N.S.I. standards. This figure also illustrates thereon the relationship of the tested arc-welded chain in contrast to the tested samples of the engaged-type and B-type chains.

As FIG. 18 indicates, the tensile rupture strength of the arc-welded chain (size No. 160) is comparable to that of a B-type chain which is one size smaller (Size. No. 140 having a chain pitch of 44.45 mm). Further, the fatigue limit of the arc-welded chain of Size No. 160 is comparable to the fatigue limit of a B-type chain of Size No. 100 (chain pitch = 31.75 mm), which B-type chain is three sizes smaller than the arc-welded chain.

Thus, compared with an arc-welded chain of the same size, the B-type chain according to the present invention results in an increase in the rupture strength of greater than 30 percent and results in a fatigue limit which is more than two times greater than that of the same size arc-welded chain.

In a similar manner, when comparing the B-type chain of the present invention to a conventional engaged-type roller chain, the B-type chain of the present invention results in a rupture strength comparable to that of a roller chain which is two sizes larger and the B-type chain results in a fatigue limit which is comparable to that of a roller chain which is three to four sizes larger.

While the experimental comparison set forth above could have been extended to chains having the bushes and/or pins braised to the link plates, nevertheless such tests were not conducted since it is well known that such braised connections are obviously inferior in strength to the connections produced utilizing arc-welding. Further, high frequency welding techniques are disadvantageous since they result in undesirable defects, such as excessive deformation of the chain.

Although a particular preferred embodiment of the invention has been disclosed in detail for illustrative purposes, it will be recognized that variations or modifications of the disclosed apparatus, including the rearrangement of parts, lie within the scope of the present invention.

Table I

| | | | No. 1 Engaged-type Chain | No. 2 Arc-Welded Chain | No. 3 Electron Beam Welded Chain A-Type | No. 4 Electron Beam Welded Chain B-Type |
|---|---|---|---|---|---|---|
| | | DIMENSIONS AND HEAT TREATMENT OF INDIVIDUAL PARTS OF CHAINS TESTED | | | | |
| Dimension of Parts (mm) | Chain Pitch | | 50.80 | 50.80 | 50.80 | 50.80 |
| | Pin Diameter | | 16.70 | 16.70 | 16.70 | 16.70 |
| | Bush Outside Diameter | | 28.58 | 28.58 | 28.58 | 28.58 |
| | Pin Link Plate | Thickness | 6.4 | 6.4 | 6.4 | 8.0 |
| | | Width | 41.6 | 48.2 | 48.2 | 48.2 |
| | Bush Link Plate | Thickness | 6.4 | 6.4 | 6.4 | 6.4 |
| | | Width | 48.2 | 48.2 | 48.2 | 48.2 |
| | Bush Link Inside Width | | 31.75 | 31.75 | 31.75 | 31.75 |
| Material of Parts | Pin | | SAE 4340 | SAE 4340 | SAE 4340 | SAE 4340 |
| | Bush | | SAE 4135 | SAE 4135 | SAE 4135 | SAE 4135 |
| | Pin Link Plate | | SAE 4135 | SAE 4135 | SAE 4135 | SAE 4135 |
| | Bush Link Plate | | SAE 4135 | SAE 4135 | SAE 4135 | SAE 4135 |
| | Pin | Hardening | 860°C-20 minutes Oil Quenched | 860°C-20 minutes Oil Quenched | 860°C-20 minutes Oil Quenched | 860°C-20 minutes Oil Quenched |
| | | Tempering | 200°C-180 minutes Air Cooled | 200°C-180 minutes Air Cooled | 200°C-180 minutes Air Cooled | 200°C-180 minutes Air Cooled |
| | | Hardening | 870°C-20 minutes Oil Quenched | | 870°C-20 minutes Oil Quenched | |

Table I-continued

DIMENSIONS AND HEAT TREATMENT OF INDIVIDUAL PARTS OF CHAINS TESTED

| | | | No. 1 Engaged-type Chain | No. 2 Arc-Welded Chain | No. 3 Electron Beam Welded Chain A-Type | No. 4 Electron Beam Welded Chain B-Type |
|---|---|---|---|---|---|---|
| Welding and Heat Treatment of Parts | Bush Pin Link Plate | Tempering Hardening Tempering | 430°C–180 minutes Air Cooled 870°C–20 minutes Oil Quenched 430°C–180 minutes Air Cooled | 870°C–20 minutes Oil Quenched 430°C–180 minutes Air Cooled | 200°C–180 minutes Air Cooled 870°C–20 minutes Oil Quenched 430°C–180 minutes Air Cooled | 870°C–20 minutes Oil Quenched 430°C–180 minutes Air Cooled |
| | Bush Link Plate | Hardening Tempering | 870°–20 minutes Oil Quenched 430°C–180 minutes Air Cooled | | 870°C–20 minutes Oil Quenched 430°C–180 minutes Air Cooled | |
| | Bush Link Plate Sub-assembly | Welding | | | After assembling pins and pin link plates into a pin-link subassembly, following the above heat treatments, the entire portions where the pins and pin link plates were engaged were fused together by electron-beam-welding. | |
| | | Tempering After Welding | | | 200°C–180 minutes Air Cooled (to remove welding strain) | |
| Welding and Heat Treatment of Parts | Bush Link Plate Sub-assembly | Welding | | After assembling edge-prepared bushes and bush link plates into a bush-link subassembly, all of the edge-prepared portions were arc-welded, using Type MA-96 welding rod for SAE 4135 made by Kobe Steel, Ltd. | After assembling bushes and bush link plates into a bush-link subassembly, following the above heat treatments, the entire portions where the bushes and bush link plates were engaged were fused together by electron-beam-welding. Welding depth = Bush link plate thickness. | After assembling bushes and bush link plates into a bush-link subassembly, the entire portions where the bushes and bush link plates were engaged were fused together by electron-beam-welding to make a one-piece bush link. Welding depth = Bush link plate thickness. |
| | | Hardening after welding Tempering after welding | | 870°C–30 minutes Oil quenched 430°C–180 minutes Air Cooled | 200°C–180 minutes Air Cooled (to remove welding strain) | 870°C–30 minutes Oil Quenched 430°C–180 minutes Air Cooled |
| Hardness of Parts | Pin Bush Pin Link Plate Bush Link Plate | | Rc 52–54 Rc 42–43 HB 388~401 HB 388~401 | Rc 52–53 Rc 42–43 HB 388~401 HB 388~401 | Rc 52–53 Rc 50–51 HB 388~401 HB 388~401 | Rc 52–53 Rc 42–43 HB 388~401 HB 388~401 |

Table II
STATIC TENSILE RUPTURE STRENGTHS OF THE CHAINS TESTED
(Equivalent to A.N.S.I. Designation of 160)

| | No. 1 Engaged-type Chain | No. 2 Arc-Welded Chain | No. 3 Electron-Beam Welded Chain A-Type | No. 4 Electron-Beam Welded Chain B-Type |
|---|---|---|---|---|
| Tensile Rupture Test Procedure | The tensile rupture test was performed after setting each sample chain on the tester proper through a pair of holder blocks. Each chain was tested following the same procedures. | | | |
| Chain Sample | No. 1 Engaged-type Chain | No. 2 Arc-Welded Chain | No. 3 Electron-Beam Welded Chain A-Type | No. 4 Electron-Beam Welded Chain B-Type |
| Number of Links | Three links (with bush links at both ends) | Three links (with bush links at both ends) | Three links (with bush links at both ends) | Three links (with bush links at both ends) |
| Testing Equipment | Hydraulic, horizontal tension tester, manufactured by Maekawa Testing Machine Manufacturing Co., Ltd. (Capacity 200 tons) | Hydraulic, horizontal tension tester, manufactured by Maekawa Testing Machine Manufacturing Co., Ltd. (Capacity 200 tons) | Hydraulic, horizontal tension tester, manufactured by Maekawa Testing Machine Manufacturing Co., Ltd. (Capacity 200 tons) | Hydraulic, horizontal tension tester, manufactured by Maekawa Testing Machine Manufacturing Co., Ltd. (Capacity 200 tons) |

|  |  |  |  |  |  |  |
|---|---|---|---|---|---|---|
| Tensile Rupture Strength (Kg) | Experimental Valves | 1 | 28,200 | 35,000 | 42,500 | 46,300 |
|  |  | 2 | 28,400 | 35,300 | 42,500 | 46,400 |
|  |  | 3 | 28,600 | 35,500 | 42,600 | 46,500 |
|  |  | 4 | 28,700 | 35,600 | 42,800 | 46,500 |
|  |  | 5 | 28,700 | 35,800 | 43,100 | 46,800 |
|  | Statistical Valves | x | 28,520 | 35,440 | 42,700 | 46,500 |
|  |  | R | 500 | 800 | 600 | 500 |
|  |  | σ | 194 | 273 | 255 | 167 |
| Breaking Position |  |  | All in the perforated portion of the bush link plate (See FIG. 10) | All in the welded portion of the bush-link subassembly, but closer to the perforated portion of the bush link plate (see FIG. 11). | All in the perforated portion in the pin link plate, but closer to where the pin is engaged (see FIG. 12). | The pin (See FIGS. 13 and 14). |
| Mean Strength Ratio | Compared with Claim No. 1 |  | 1.00 | 1.24 | 1.50 | 1.63 |
|  | Compared with Claim No. 2 |  | 0.80 | 1.00 | 1.20 | 1.31 |
|  | Compared with Claim No. 3 |  | 0.67 | 0.83 | 1.00 | 1.09 |
|  | Compared with Claim No. 4 |  | 0.61 | 0.76 | 0.92 | 1.00 |

The embodiments of the invention in which an exclusive property or privilege is claimed are defined as follows:

1. A roller chain comprising a series of inner links each comprising a pair of parallel inner link plates having opposed openings adjacent the opposite ends thereof and a pair of hollow bushes respectively extending into and between said opposed openings for securing said inner link plates together, said inner links being connected together by a series of outer links each comprising a pair of parallel outer link plates having opposed openings adjacent the opposite ends thereof and a pair of pins extending into and between said opposed openings for securing said outer link plates together, said pins on a given outer link extending through the bushes on the adjacent ends of two inner links to connect same together, the improvement wherein said bushes extend completely through the associated openings in said inner link plates, both ends of each of said bushes terminating substantially flush with the outer surfaces of the associated inner link plates, and both ends of each of said bushes being fused in the associated openings of the inner link plates by a fillerless fusion welded connection which extends through the entire thickness of the inner link plates so that the entire circumference of the end portions of the bushes as disposed in the opposed openings are fixedly and integrally united to their associated inner link plates.

2. A chain according to claim 1, wherein the individual inner and outer link plates are substantially flat and of substantially uniform thickness.

3. A chain according to claim 2, wherein the outer link plates have a thickness which is greater than the inner link plates.

4. A chain according to claim 1, wherein both ends of each of said pins terminate substantially flush with the outer surfaces of their associated outer link plates, and said both ends of each of said pins being fused to the respective outer link plates by a fillerless fusion welded connection which extends throughout the entire thickness of the respective outer link plate so that the entire circumference of the end portions of the pins as disposed in the opposed openings are fixedly and integrally united to the associated outer link plates.

5. A chain according to claim 4, wherein the individual inner and outer link plates are substantially flat and are of substantially uniform thickness, and wherein the outer link plates have a thickness which is at least as large as the thickness of the inner link plates.

6. A chain according to claim 1, wherein the fillerless fusion welded connection is formed by electron beam or laser welding.

* * * * *